US008152602B2

(12) United States Patent
Guth

(10) Patent No.: US 8,152,602 B2
(45) Date of Patent: Apr. 10, 2012

(54) GRINDER AND CORE DRILL WITH DUST COLLECTION

(75) Inventor: Paul W. Guth, Moreno Valley, CA (US)

(73) Assignee: JPL Global, LLC, Moreno Valley, CA (US)

( * ) Notice: Subject to any disclaimer, the term of this patent is extended or adjusted under 35 U.S.C. 154(b) by 592 days.

(21) Appl. No.: 12/362,744

(22) Filed: Jan. 30, 2009

(65) Prior Publication Data
US 2010/0197211 A1 Aug. 5, 2010

(51) Int. Cl.
B24B 55/06 (2006.01)

(52) U.S. Cl. ........ 451/456; 451/352; 451/357; 15/327.5

(58) Field of Classification Search ................. 451/352, 451/357, 456, 87, 90; 15/327.5, 143.1, 339, 15/344, 412; 16/426; 307/38
See application file for complete search history.

(56) References Cited

U.S. PATENT DOCUMENTS

| 1,353,966 | A | * | 9/1920 | Lorenz | 451/494 |
|---|---|---|---|---|---|
| 1,408,851 | A | * | 3/1922 | Weiss | 451/496 |
| 1,971,790 | A | * | 8/1934 | Mall | 451/359 |
| 2,312,157 | A | * | 2/1943 | Galbreath et al. | 74/600 |
| 2,316,886 | A | * | 4/1943 | Pascucci | 451/353 |
| 2,922,261 | A | * | 1/1960 | Rabkin et al. | 451/359 |
| 3,817,115 | A | * | 6/1974 | Schnizler et al. | 74/417 |
| 4,158,935 | A | * | 6/1979 | Robert | 451/359 |
| 4,164,101 | A | * | 8/1979 | Robert | 451/456 |
| 4,311,063 | A | * | 1/1982 | Sistare | 74/395 |
| 4,341,505 | A | | 7/1982 | Bentley | |
| 4,404,706 | A | * | 9/1983 | Loyd | 15/344 |
| 4,711,609 | A | | 12/1987 | Seefluth | |
| 4,937,984 | A | * | 7/1990 | Taranto | 451/524 |
| 5,099,157 | A | * | 3/1992 | Meyer | 327/456 |
| 5,120,983 | A | * | 6/1992 | Samann | 307/38 |
| 5,535,479 | A | * | 7/1996 | Pink et al. | 15/410 |
| 5,541,457 | A | * | 7/1996 | Morrow | 307/38 |
| 5,595,532 | A | * | 1/1997 | McCracken | 451/357 |
| 5,955,791 | A | * | 9/1999 | Irlander | 307/38 |
| 5,964,645 | A | * | 10/1999 | Jemt | 451/41 |
| 6,047,693 | A | | 4/2000 | Yamami et al. | |
| 6,073,301 | A | * | 6/2000 | Berfield | 15/327.5 |
| 6,099,080 | A | * | 8/2000 | Hirashita et al. | 299/39.3 |
| 6,151,749 | A | * | 11/2000 | Berfield | 15/327.5 |
| 6,155,246 | A | | 12/2000 | Yamami et al. | |
| 6,315,647 | B1 | * | 11/2001 | Ghilardi | 451/75 |
| 6,386,961 | B1 | * | 5/2002 | Cureton | 451/358 |
| 6,595,196 | B2 | | 7/2003 | Bath | |
| 6,814,156 | B2 | * | 11/2004 | Dieterle et al. | 173/170 |
| 6,830,113 | B2 | * | 12/2004 | Moore et al. | 173/198 |
| 6,883,202 | B2 | * | 4/2005 | Steffen et al. | 15/323 |
| 6,896,604 | B1 | | 5/2005 | Taylor et al. | |
| 6,988,940 | B1 | * | 1/2006 | Taylor | 451/354 |

(Continued)

Primary Examiner — George Nguyen
(74) Attorney, Agent, or Firm — Lewis Kohn & Fitzwilliam LLP; Timothy W. Fitzwilliam

(57) ABSTRACT

A core drill or a grinder power tool design is disclosed herein also incorporated to a dust collection apparatus. The tool has a motor portion and a shaft portion, the shaft portion being characterized by a hollow shaft together with a casing forming a conduit for the dust created during coring or grinding applications. A harness is provided to the collection apparatus and the overall design is portable and functional right-handed or left-handed. A ring gear configuration is provided to transfer shaft power at a right angle. Further, several bearings are introduced to align shafts and absorb thrust created while applying pressure to a work piece. Power is additionally supplied to the power tool via a special modification to the collection apparatus.

16 Claims, 5 Drawing Sheets

U.S. PATENT DOCUMENTS

| | | | |
|---|---|---|---|
| 7,013,884 B2 | 3/2006 | Guth | |
| 7,223,161 B2 | 5/2007 | Kodani et al. | |
| 7,296,323 B2 * | 11/2007 | Hayama et al. | 15/339 |
| 7,797,794 B2 * | 9/2010 | Bleicher et al. | 15/415.1 |
| 2004/0043711 A1 * | 3/2004 | Daniel | 451/87 |
| 2006/0272120 A1 * | 12/2006 | Barrick et al. | 15/321 |
| 2007/0017191 A1 | 1/2007 | Miller et al. | |
| 2007/0034064 A1 | 2/2007 | Nishikawa et al. | |
| 2007/0174992 A1 * | 8/2007 | Murray et al. | 15/326 |
| 2007/0209162 A1 * | 9/2007 | McRoberts et al. | 16/426 |
| 2007/0292749 A1 * | 12/2007 | Coombs et al. | 429/96 |
| 2008/0022484 A1 * | 1/2008 | Caruso | 15/344 |
| 2008/0163492 A1 | 7/2008 | Johansson | |
| 2008/0229719 A1 | 9/2008 | Hayama et al. | |
| 2008/0276776 A1 | 11/2008 | Kani et al. | |
| 2009/0095780 A1 * | 4/2009 | Wangeby et al. | 224/262 |
| 2009/0172912 A1 * | 7/2009 | Knopow | 15/344 |
| 2009/0307863 A1 * | 12/2009 | Milne et al. | 15/344 |
| 2011/0162164 A1 * | 7/2011 | Shibata et al. | 15/339 |

* cited by examiner

GRINDER AND CORE DRILL WITH DUST COLLECTION

BACKGROUND OF THE INVENTION

1. Field of the Invention

The present invention pertains generally to masonry tools. More specifically, the present invention relates to core drilling and grinding devices and methods that further maximize containment of dust contaminant while cutting cinder block, concrete, brick, clay, stone, tile and the like.

2. Description of the Prior Art

Devices for grinding, drilling or cutting masonry or stone materials have been known for some time. Also known, is a problem of uncontrolled release of and exposure to airborne dust and particulate matter resulting from the grinding and cutting. As a result, government agencies such as OSHA have promulgated safety and health requirements for wet and dry cutting. In addition to health issues, the dust by-products present a clean-up challenge, even if all individuals in a contained environment have donned respirators.

Development of wet cutting devices and methods is one solution to dust abatement. In doing so, water is applied at the edge of cutting where dust is entrained to the fluid and directed to a holding area. While most wet cutting methods work relatively well, they create additional problems of pollution and environmental concerns. Further, the process creates slurry that adheres to cutting tool materials and components that also requires periodic cleaning.

Many prior art solutions have been proposed that specifically employ dry means to control dust. Examples of such designs include. "Cutting And Dust Collecting Assembly," by Johansson. U.S. Pat. App. Pub. No. 2008/0163492, "Cutting Apparatus with Dust Discharging," to Kodani et al., U.S. Pat. No. 7,223,161, "Dust-Free Masonry Cutting Tool," to Bath, U.S. Pat. No. 6,595,196. "Dust Collector for A Power Tool," by Miller et al., U.S. Pat. Pub. No. 2007/0017191, to name a few. Such solutions do not work optimally for various reasons including a lack of a design that is comfortable and easy to work with for a user even in a compact environment. In the case of grinding applications, many prior solutions have the grinding edge covered by a shroud that obscures the operator's view of the work area.

Yet another similar device was proposed by present inventor, Guth entitled "Dust Collection System for A Masonry Saw," U.S. Pat. No. 7,013,884, and assigned to Masonry Technology Incorporated, assignee of the present invention. This earlier design is a table saw design for masonry applications and not a portable power tool.

In light of the above, it is an object of the present invention to provide a Grinder And Core Drill with Dust Collection that is more efficient among other beneficial aspects over prior art solutions. More specifically, it is an object of the present invention to provide power core and grind device that integrates dust collection to a single portable unit. It is still a further object of the present invention to provide a shroudless design while still providing occupational safety to a user. It is still a further object of the present invention to provide a design including a conduit for dust collection.

BRIEF SUMMARY OF THE INVENTION

The present invention specifically addresses and alleviates the above mentioned deficiencies, more specifically, the present invention is directed to a power tool comprising: a rotating cylindrical hollow shaft about a first axis; a ring gear coupled to the shaft; a casing housing the hollow shaft and ring gear, the casing having upper and lower openings about the first axis, the upper opening coupled to a vacuum apparatus providing negative pressure with respect to atmosphere, the upper and lower openings together with the hollow shaft forming a conduit to collect dust from a work piece created as a byproduct from use of the power tool.

The invention is additionally characterized in that the hollow shaft further comprises: a first threaded portion at a distal end of the hollow shaft, the first threaded portion configured to receive a core bit or a grinding wheel; and a hexagonal stabilizing portion wherein the stabilizing portion is configured to secure the hollow shaft using a wrench device when removing or attaching said core bit or said grinding wheel.

Still further, the hollow shaft in a preferred embodiment further comprises: a lower bearing seat about the hollow shaft; a lower bearing securing the hollow shaft translationally and rotationally, wherein the lower bearing seat is an abutment to the lower bearing; an upper bearing securing the hollow shaft translationally and rotationally, wherein the ring gear is configured between said upper and lower bearings; and an upper bearing seal at an upper portion of the upper bearing; the upper bearing seal maintaining pressure to lubrication of rotating components, wherein the upper bearing seal and the lower bearing seat have an equal outside diameter with respect to the first axis.

Still further the hollow shaft also comprises: a 30 degree taper at a proximal end to slip fit components with close tolerances; a second threaded portion approximately at a middle area of the hollow shaft, the second threaded portion engaging a ring gear; a ring gear seat wherein the ring gear seat is an abutment to the ring gear, wherein the ring gear further includes two cavities to engage a spanner wrench for assembling and disassembling the ring gear with respect to the hollow shaft.

Yet further, the power tool of a preferred embodiment further comprises: a motor drive shaft about a second axis at a right angle to the first axis, the motor drive shaft having a pinion at an end thereof engaging the ring gear, wherein the drive shaft, pinion, and ring gear together impart rotation to the hollow shaft; and a drive shaft bearing providing translational and rotational support to the drive shaft.

Still further, the power tool can be additionally characterized as having a handle, the handle comprising: first and second bars extending outwardly in opposite directions from the casing; and a curved member connecting the first and second bars and forming the handle, the casing further comprising a cap to provide access to inner components thereof.

Yet still further, the power tool is characterized as further comprising a tool power cord mating with a plug configured to the vacuum apparatus, the vacuum apparatus further comprising: a vacuum power cord to supply power to a vacuum fan and the power tool via the plug and the tool power cord; and a harness coupled to the vacuum apparatus to secure the vacuum apparatus to a back of a user providing mobility of the power tool and the vacuum apparatus together, the harness further including a shoulder portion and a waist portion.

While the apparatus and method has or will be described for the sake of grammatical fluidity with functional explanations, it is to be expressly understood that the claims, unless expressly formulated under 35 USC 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Figure 1:
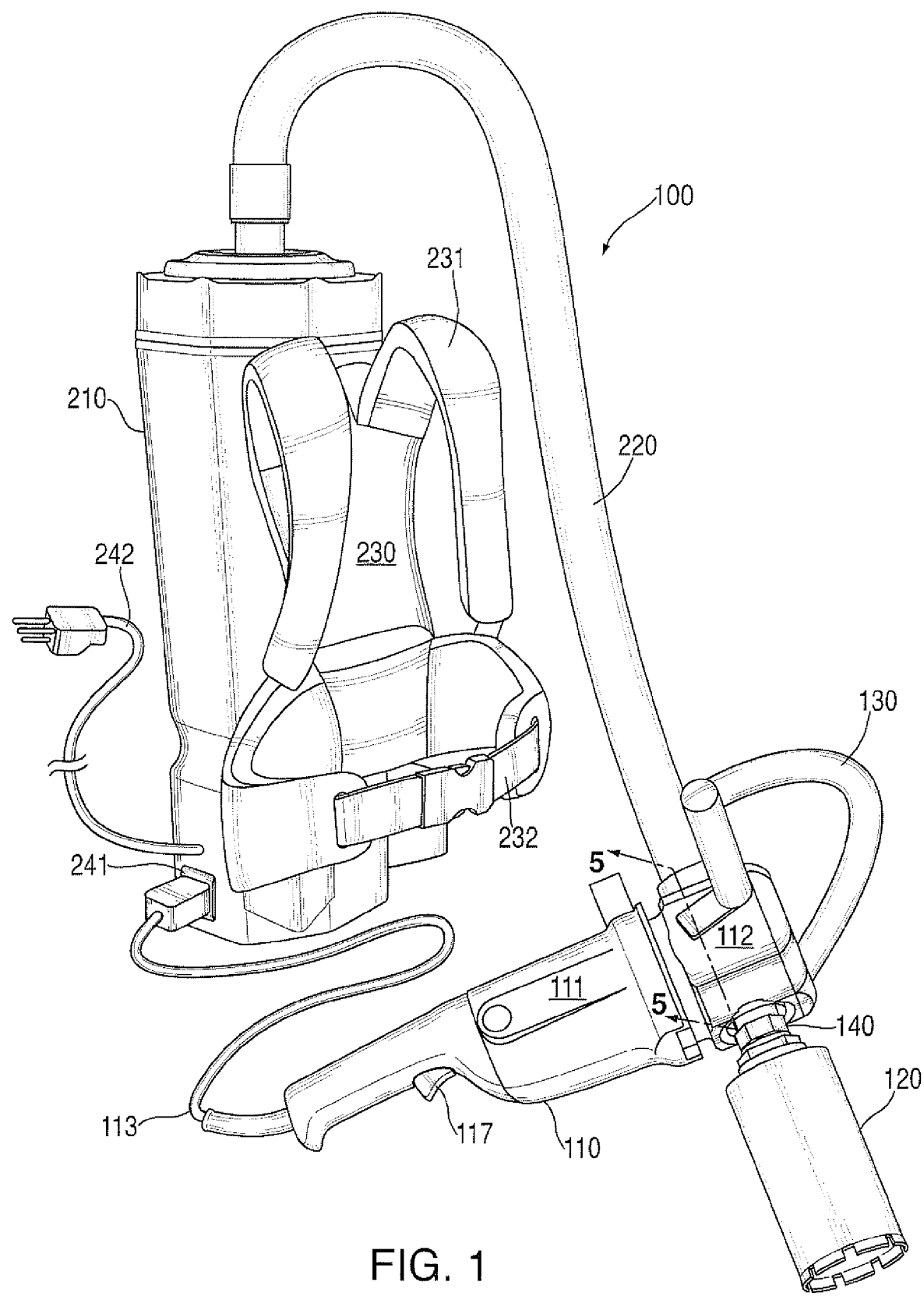
FIG. 1 is an perspective view of a preferred embodiment of the present invention.

Referring initially to FIG. 1, a perspective illustration of a power tool 110 coupled to a vacuum apparatus 210 according to a preferred embodiment 100 of the present invention is shown. In the example a core bit 120 is attached to a shaft portion 112 wherein the core bit is applied to a work piece 121 for drilling or boring applications. Additionally, a grinding wheel could be attached to the shaft portion in lieu of the core bit 120 for grinding applications. Motor portion 111 houses an electrical motor that provides shaft output for the device, the motor being activated by trigger 117. In the grinding application, the invention 100 allows the user to grind without a shroud that would obscure a user's view of a work area.

Also with reference to FIG. 1, a handle 130 of the present invention attaches to the shaft portion 112, or more specifically a case housing 350, 550 of the present invention. The handle 130 includes two bars extending outwardly from the shaft portion, the two bars being connected by a curved member at an opposing side with respect to the motor portion 111. It can be readily appreciated that the tool 110 can be right-handed or left-handed in this design.

Also in the illustrated configuration, vacuum apparatus 210 is adapted with a power plug 241 so it can receive power from a wall plug, for example, via vacuum cord 242, and subsequently transfer power to the power tool 110, via plug 241. In this way, a single power source is provided for both vacuum fan and power tool motor portion 111. Plug 241 is further adapted with a relay so that when the flow of electricity is stopped by releasing trigger 117, power to the vacuum apparatus 210 is subsequently secured. It is further contemplated by the present invention that the vacuum could be configured with simple electronics so that vacuum suction power would remain energized for a time delay after trigger 117 is released. The time delay would serve to limit back flow of dust in the moments following release of the trigger.

Figure 2:
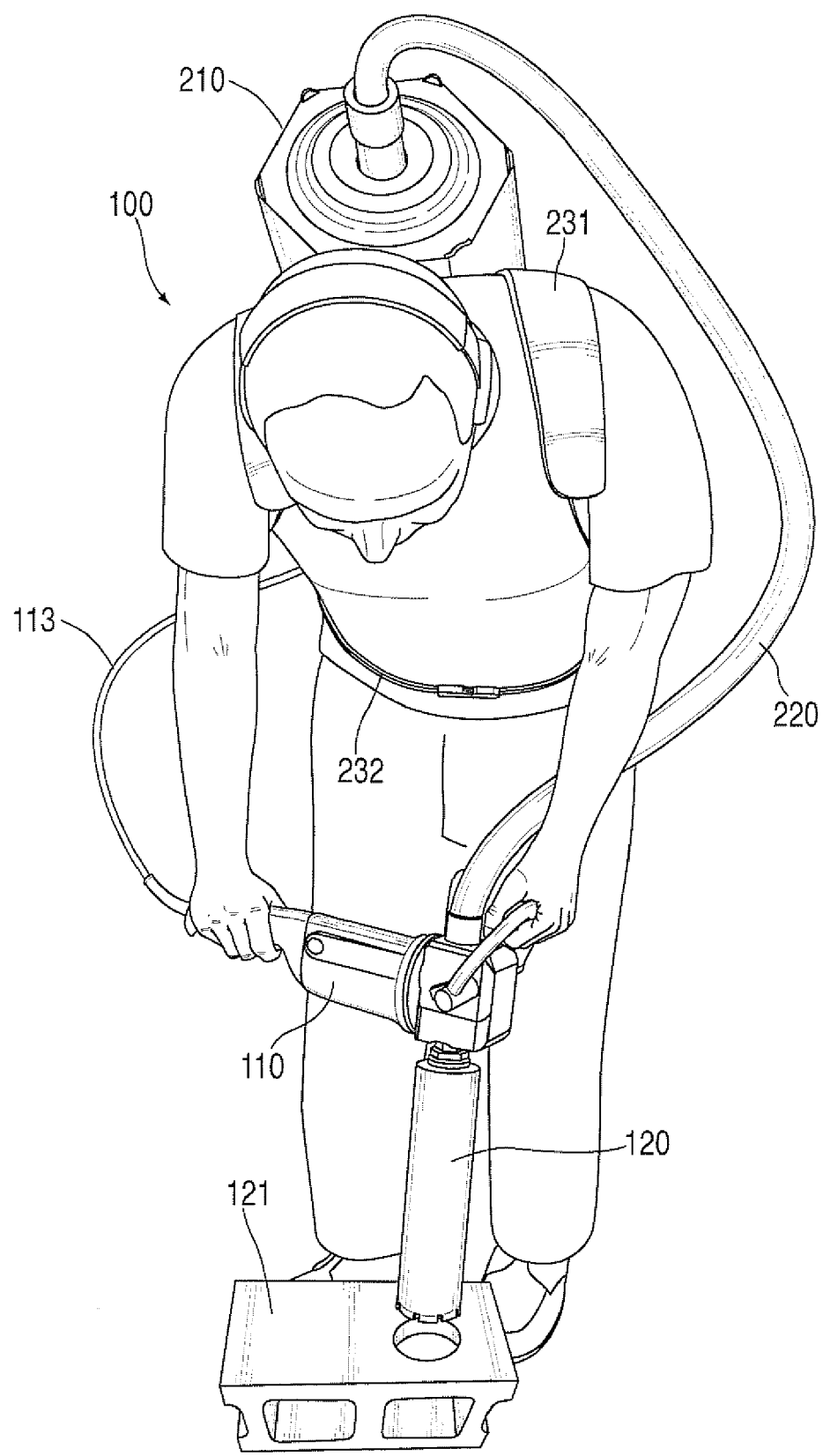
FIG. 2 is a an additional perspective view of an invention embodiment showing a user and a work piece.

Vacuum apparatus 210 is additionally modified with a harness 230 to be supported on the back of a user like a backpack (FIG. 2). The harness 231 has shoulder straps to support the weight thereof in addition to a waist belt 232 to secure a lower part of vacuum apparatus. Further as an optional modification the present invention may be modified to a stationary vacuum without a harness, the stationary vacuum coupled to a dolly or the like.

Referring to FIG. 2, a user positions the core drill with dust collection 100 over a work piece 121. As illustrated a cinder block 121 is being worked upon. In general, the present invention 100 is applicable to masonry applications and a work piece 121 could also comprise roofing, clay, brick, stone, granite, concrete or composites thereof. Additionally, the apparatus 100 is very portable and provides excellent mobility from its right angle design wherein the tool's 110 rotational power and the bit's 120 rotation are at right angles with respect to one another. Flexible hose 220 connects the tool 110 to the vacuum chamber 210.

Figure 3:
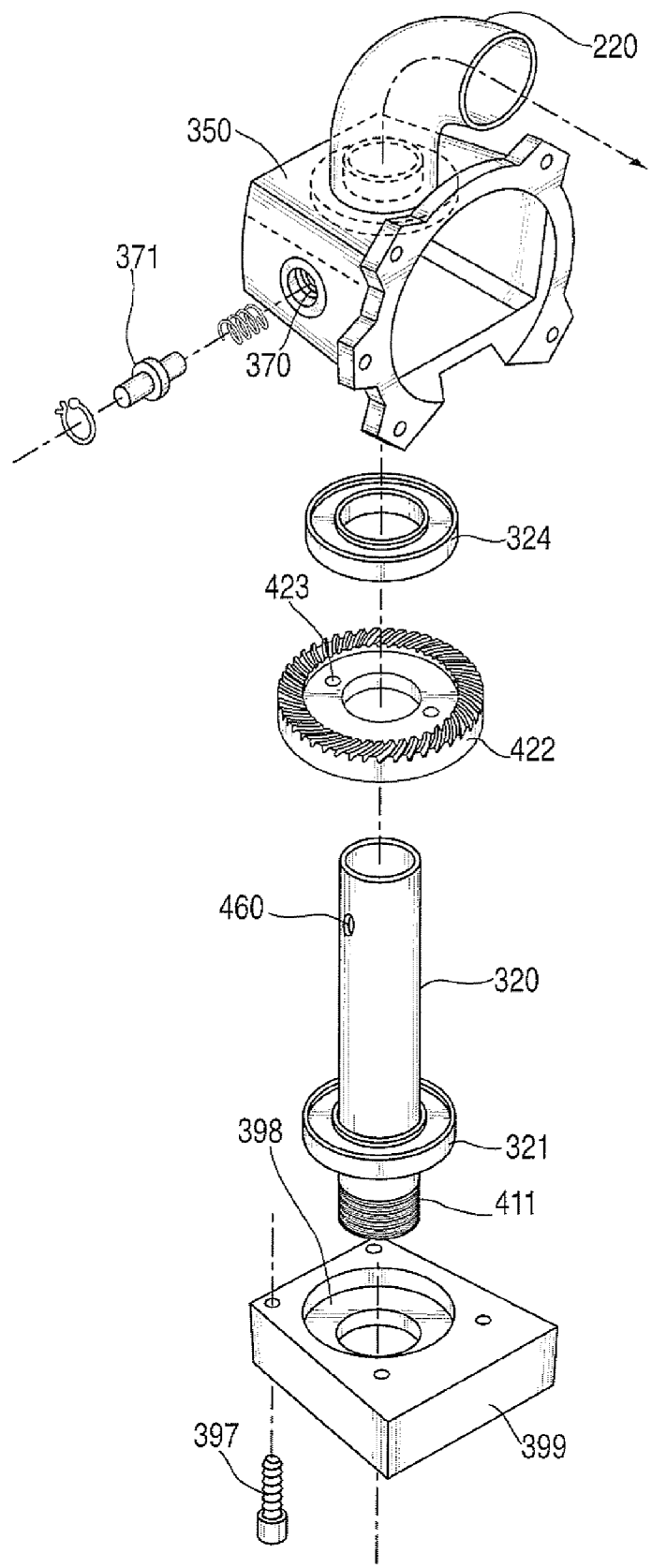
FIG. 3 is an exploded view of a shaft portion of the present invention with related components.
Figure 5:
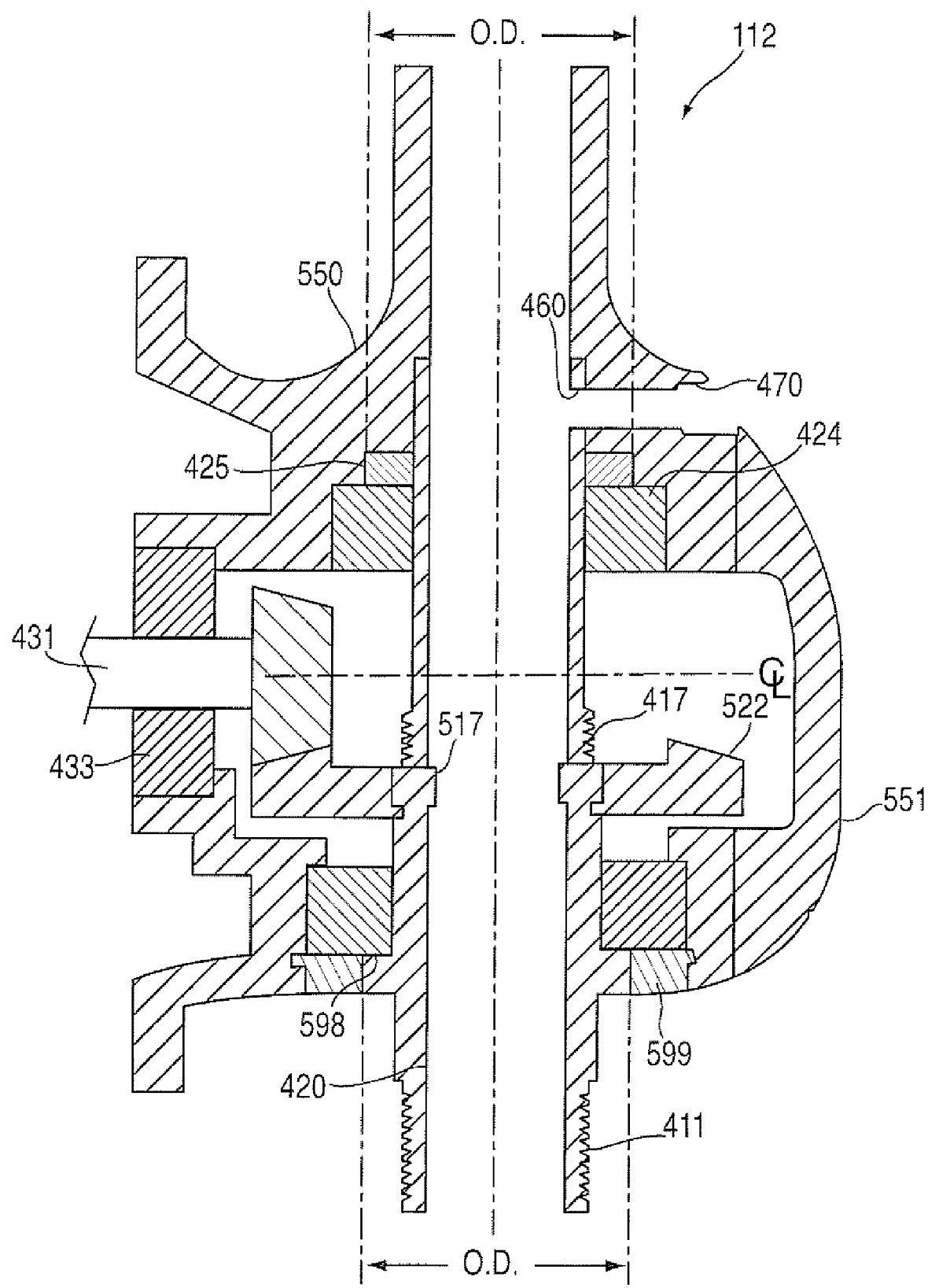
FIG. 5 is a cross-sectional view of a shaft portion of the present invention taken along line 5-5 in FIG. 1

With reference to FIG. 3, an exploded view of an exemplary shaft portion 312 of the present invention is illustrated. Cylindrical hollow shaft 320 defines a conduit about an axis that allows for the flow of dust particles. Ring gear 422 translates power from a perpendicular motor shaft 431 to the hollow shaft 320. The shaft 320 is further supported radially and translationally by upper 324 and lower 321 bearings. In this embodiment, casing 350 has a pin hole 370 penetration on a side adjacent to an opening for a casing cover 550 (FIG. 5). Hollow shaft 320 can be secured in place with pin 371, also via hole 460, also including a spring with a pin lock. The casing 350 opening is provided for the purpose to provide access to internal components such as the ring gear 422, and bearings 321, 324.

The example in FIG. 3 additionally includes bearing block 399 for absorbing translational load. The bearing block has a seat 398 to abut the lower bearing 321. Pin 397 is provided to secure and remove bearing block 399. In other embodiments, FIG. 5 for example, bearing block 599 and lower bearing seat 598 can be partially or wholly incorporated into casing 550.

Figure 4A:
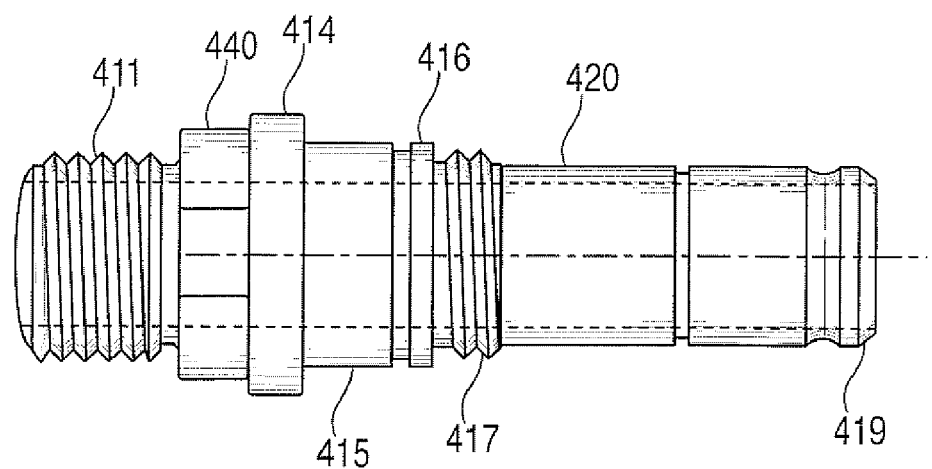
FIG. 4A is a profile view of a hollow shaft of the present invention.
Figure 4B:
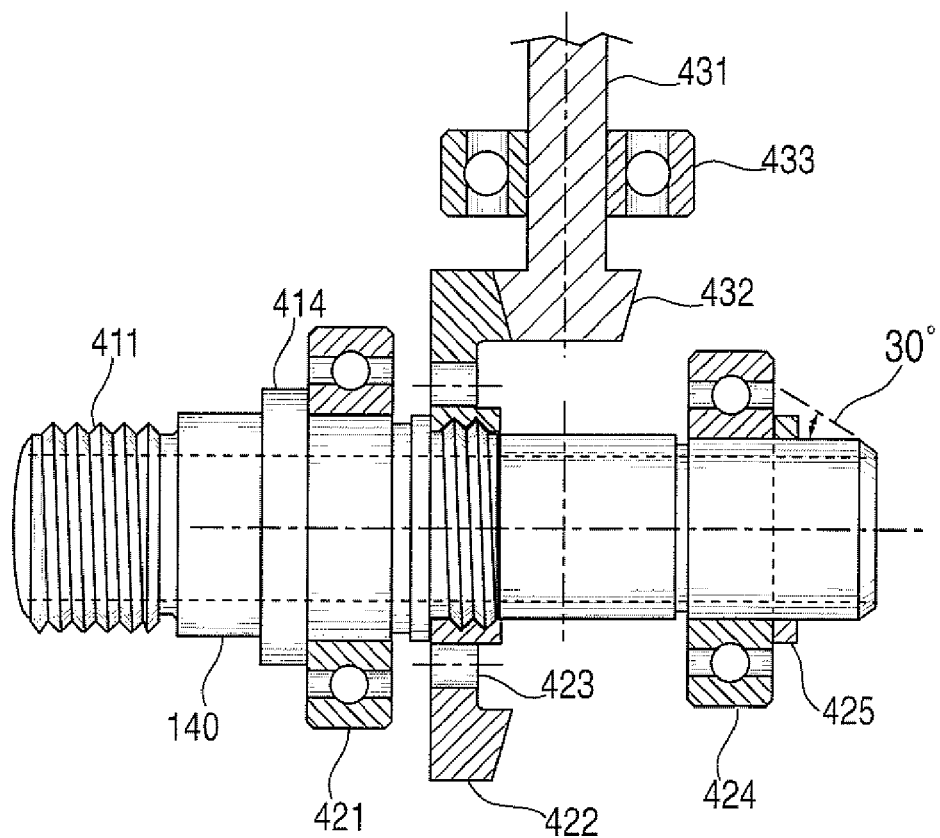
FIG. 4B is a partial sectional view showing the shaft of FIG. 4A with additional bearings and gears in cross-section.

Turning to FIGS. 4A and 4B, profile views of a hollow shaft 420 embodiments are illustrated. Hexagonal stabilizing portion 1.40 is provided as an alternative to pin 371 for securing the hollow shaft 420 with a wrench, for example, while changing core bits or grinding wheels. Similarly, FIG. 4B illustrates related structure 440 that has carve outs (not visible) to engage a wrench. In the example, a lower bearing seat 414 is provided in lieu of bearing block seat 398, 598.

Bearings 421, 424, 433 are ball bearings as illustrated however could be realized by other suitable bearings known in the art. Ring gear 422 is supported by ring gear seat 416 and is engaged to the hollow shaft 420 via threaded portion 417. Cavities 423 allow for ring gear 422 to be engaged by a spanner wrench for assembly and removal. The shaft 420 additionally has a 30 degree tapered proximal end 419 to slip fit bearings thereto. Still further, motor shaft 431 has a pinion 432 to engage ring gear 422 and thereby translates its power at a right angle.

FIG. 5 further exemplifies another embodiment of shaft portion 112 of the present invention 100. As shown, ring gear 522 engages hollow shaft 420 via spline teeth 517. Seal 425 maintains pressure to lubrication or grease needed for internal components. Also as an example, seal 425 has an outer diameter (od) that is equal to outer diameter of a bearing block seat 598. Pin hole 460, 470 in the example is located just above the case housing 550 cover 551 as an alternative to the embodiment shown in FIG. 3.

While the particular Grinder and Core Drill with Dust Collection herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A power tool comprising:
 a rotating cylindrical hollow shaft about a first axis;
 a ring gear coupled to the shaft; and
 a casing housing the hollow shaft and ring gear, the casing having upper and lower openings about the first axis, the upper opening coupled to a vacuum apparatus providing negative pressure with respect to atmosphere, the upper and lower openings together with the hollow shaft forming a conduit to collect dust from a work piece created as a byproduct from use of the power tool, and wherein the hollow shaft further comprising:
 a 30 degree taper at a proximal end to slip fit components with close tolerances:
 a second threaded portion approximately at a middle area of the hollow shaft, the second threaded portion engaging a ring gear;
 a ring gear seat wherein the ring gear seat is an abutment to the ring gear, wherein the ring gear further includes two cavities to engage a spanner wrench for assembling and disassembling the ring gear with respect to the hollow shaft.

2. The power tool of claim 1, the hollow shaft further comprising:
 a first threaded portion at a distal end of the hollow shaft, the first threaded portion configured to receive a core bit or a grinding wheel; and
 a hexagonal stabilizing portion wherein the stabilizing portion is configured to secure the hollow shaft using a wrench device when removing or attaching said core bit or said grinding wheel.

3. The power tool of claim 1, the hollow shaft further comprising:
 a lower bearing seat about the hollow shaft;
 a lower bearing securing the hollow shaft translationally and rotationally, wherein the lower bearing seat is an abutment to the lower bearing;
 an upper bearing securing the hollow shaft translationally and rotationally, wherein the ring gear is configured between said upper and lower bearings; and
 an upper bearing seal at an upper portion of the upper bearing; the upper bearing seal maintaining pressure to lubrication of rotating components, wherein the upper bearing seal and the lower bearing seat have an equal outside diameter with respect to the first axis.

4. The power tool of claim 1 further comprising:
 a motor drive shaft about a second axis at a right angle to the first axis, the motor drive shaft having a pinion at an end thereof engaging the ring gear, wherein the drive shaft, pinion, and ring gear together impart rotation to the hollow shaft; and
 a drive shaft bearing providing translational and rotational support to the drive shaft.

5. The power tool of claim 1, further comprising:
 a handle comprising:
 first and second bars extending outwardly in opposite directions from the casing; and
 a curved member connecting the first and second bars and forming the handle, the casing further comprising a cap to provide access to inner components thereof.

6. The power tool of claim 1 further comprising a tool power cord mating with a plug configured to the vacuum apparatus, the vacuum apparatus further comprising:
 a vacuum power cord to supply power to a vacuum fan and the power tool via the plug and the tool power cord; and
 a harness coupled to the vacuum apparatus to secure the vacuum apparatus to a back of a user providing mobility of the power tool and the vacuum apparatus together, the harness further including a shoulder portion and a waist portion.

7. A power tool and dust collection apparatus comprising;
 a rotating cylindrical hollow shaft about a first axis forming a conduit to collect dust byproducts from a work piece;
 a vacuum apparatus; and
 a tool power cord mating with a plug configured to a vacuum apparatus, the vacuum apparatus further comprising:
 a vacuum power cord to supply power to a vacuum fan and the power tool via the plug and the tool power cord; and
 a harness coupled to the vacuum apparatus to secure the vacuum apparatus to a back of a user providing mobility of the power tool and dust collection apparatus, the harness further including a shoulder portion and a waist portion, and further wherein the hollow shaft comprising:
 a lower bearing seat about the hollow shaft;
 a lower bearing securing the hollow shaft translationally and rotationally, wherein the lower bearing seat is an abutment to the lower bearing;
 an upper bearing securing the hollow shaft translationally and rotationally, wherein the ring gear is configured between said upper and lower bearings; and
 an upper bearing seal at an upper portion of the upper bearing; the upper bearing seal maintaining pressure to lubrication of rotating components, wherein the upper bearing seal and the lower bearing seat have an equal outside diameter with respect to the first axis.

8. The power tool and dust collection apparatus of claim 7 further comprising:
 a ring gear coupled to the hollow shaft; and
 a casing housing the hollow shaft and ring gear, the casing having upper and lower openings about the first axis, the upper opening coupled to the vacuum apparatus providing negative pressure with respect to atmosphere, the upper and lower openings together with the hollow shaft forming the conduit to collect dust from the work piece.

9. The power tool and dust collection apparatus of claim 7, the hollow shaft further comprising:
 a first threaded portion at a distal end of the hollow shaft, the first threaded portion configured to receive a core bit or a grinding wheel; and
 a hexagonal stabilizing portion wherein the stabilizing portion is configured to secure the hollow shaft using a wrench device when removing or attaching said core bit or said grinding wheel.

10. The power tool and dust collection apparatus of claim 7, the hollow shaft further comprising:
 a 30 degree taper at a proximal end to slip fit components with close tolerances;
 a second threaded portion approximately at a middle area of the hollow shaft, the second threaded portion engaging a ring gear; and a ring gear seat wherein the ring gear seat is an abutment to the ring gear, wherein the ring gear further includes two cavities to engage a spanner wrench for assembling and disassembling the ring gear with respect to the hollow shaft.

11. The power tool and dust collection apparatus of claim 7 further comprising:
a motor drive shaft about a second axis at a right angle to the first axis, the motor drive shaft having a pinion at an end thereof engaging the ring gear, wherein the drive shaft, pinion, and ring gear together impart rotation to the hollow shaft; and
a drive shaft bearing providing translational and rotational support to the drive shaft.

12. The power tool and dust collection apparatus of claim 7 further comprising:
a handle comprising:
first and second bars extending outwardly in opposite directions from the casing housing; and
a curved member connecting the first and second bars and forming the handle, the casing housing further comprising a cap to provide access to inner components thereof.

13. A power tool and dust collection apparatus comprising:
a vacuum apparatus coupled to the power tool to provide dust collection thereto, the vacuum apparatus further comprising a harness to secure the vacuum apparatus to a back of a user providing mobility of the power tool and dust collection apparatus, the harness further including a shoulder portion and a waist portion;
a casing housing internal components; and
a handle connected to the power tool, the handle comprising:
first and second bars extending outwardly in opposite directions from the case housing; and
a curved member connecting the first and second bars and forming the handle;
a rotating cylindrical hollow shaft about a first axis; and
a ring gear coupled to the shaft, wherein the casing houses the hollow shaft and ring gear, the casing further having upper and lower openings about the first axis, the upper opening coupled to the vacuum apparatus providing negative pressure with respect to atmosphere, the upper and lower openings together with the hollow shaft forming a conduit to collect dust from a work piece created as a byproduct from use of the power tool, and wherein the hollow shaft further comprising:
a 30 degree taper at a proximal end to slip fit components with close tolerances;
a second threaded portion approximately at a middle area of the hollow shaft, the second threaded portion engaging the ring gear; and
a ring gear seat wherein the ring gear seat is an abutment to the ring gear, wherein the ring gear further has two cavities to engage a spanner wrench for assembling disassembling the ring gear with respect to the hollow shaft.

14. The power tool and dust collection apparatus of claim 13, the hollow shaft further comprising:
a first threaded portion at a distal end of the shaft, the first threaded portion configured to receive a core bit or a grinding wheel; and
a pin hole for receiving a pin and a pin lock for stabilizing the hollow shaft when removing or attaching said core bit or said grinding wheel.

15. The power tool and dust collection apparatus of claim 13, the hollow shaft further comprising:
a lower bearing seat about the hollow shaft;
a lower bearing securing the hollow shaft translationally and rotationally, wherein the lower bearing seat is an abutment to the lower bearing;
an upper bearing securing the hollow shaft translationally and rotationally, wherein the ring gear is configured between said upper and lower bearings; and
an upper bearing seal at an upper portion of the upper bearing; the upper bearing seal maintaining pressure to lubrication of rotating components, wherein the upper bearing seal and the lower bearing seat have an equal outside diameter with respect to the first axis.

16. The power tool and dust collection apparatus of claim 13, further comprising:
a motor drive shaft about a second axis at a right angle to the first axis, the motor drive shaft having a pinion at an end thereof engaging the ring gear, wherein the drive shaft, pinion, and ring gear together impart rotation to the hollow shaft; and
a drive shaft bearing providing translational and rotational support to the drive shaft.

\* \* \* \* \*

UNITED STATES PATENT AND TRADEMARK OFFICE
CERTIFICATE OF CORRECTION

PATENT NO.         : 8,152,602 B2
APPLICATION NO.    : 12/362744
DATED              : April 10, 2012
INVENTOR(S)        : Paul W. Guth It is certified that error appears in the above-identified patent and that said Letters Patent is hereby corrected as shown below:

In claim 13, column 8, line 11: the word --and-- should be inserted after assembling and before disassembling.

Signed and Sealed this
Fourth Day of September, 2012

David J. Kappos
*Director of the United States Patent and Trademark Office*